US012175152B1

United States Patent
Chen et al.

(10) Patent No.: US 12,175,152 B1
(45) Date of Patent: Dec. 24, 2024

(54) IMAGE DISPLAY METHOD AND CONTROL SYSTEM

(71) Applicant: Wistron Corporation, New Taipei (TW)

(72) Inventors: Li Wei Chen, New Taipei (TW); Chin Hao Hsu, New Taipei (TW); Hui-Chen Lin, New Taipei (TW); Ming Chiuan Jing, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 18/611,636

(22) Filed: Mar. 20, 2024

(30) Foreign Application Priority Data

Feb. 1, 2024 (TW) .................................. 113103963

(51) Int. Cl.
*G06F 3/14* (2006.01)
*G06T 7/11* (2017.01)
*G06V 10/25* (2022.01)
*G06V 30/10* (2022.01)

(52) U.S. Cl.
CPC .......... *G06F 3/1423* (2013.01); *G06F 3/1446* (2013.01); *G06T 7/11* (2017.01); *G06V 10/25* (2022.01); *G06V 30/10* (2022.01)

(58) Field of Classification Search
CPC ........ G06F 3/1423; G06F 3/1446; G06T 7/11; G06V 10/25; G06V 30/10
See application file for complete search history.

(56) References Cited

U.S. PATENT DOCUMENTS

| | | | |
|---|---|---|---|
| 5,267,326 A | 11/1993 | Rao | |
| 7,091,926 B2* | 8/2006 | Kulas | G06F 3/1446 345/1.3 |
| 10,019,219 B2 | 7/2018 | Yoon | |
| 12,061,775 B2* | 8/2024 | Jakobovits | G06F 3/1454 |
| 2005/0083331 A1* | 4/2005 | MacKinlay | G06F 3/1446 345/32 |
| 2005/0175251 A1* | 8/2005 | Taketa | H04N 19/184 375/E7.184 |
| 2009/0096711 A1* | 4/2009 | Jang | G06F 3/1446 345/1.3 |
| 2010/0053164 A1* | 3/2010 | Imai | G06F 3/147 345/1.3 |
| 2011/0109526 A1* | 5/2011 | Bauza | G06F 3/147 345/1.3 |

(Continued)

*Primary Examiner* — Dmitriy Bolotin
(74) *Attorney, Agent, or Firm* — JCIPRNET

(57) ABSTRACT

An image display method and a control system are provided. A processor is configured to split an original image into multiple sub-images and then output the sub-images to multiple corresponding displays to respectively display. Process of splitting the original image includes: finding multiple regions of interest (ROIs) in the original image to generate a ROI matrix; using a mask to perform a specified operation on each pixel of the original image to obtain a priority matrix; performing gradient calculation on each pixel of the original image to generate a gradient matrix; generating an integration matrix based on the ROI matrix, the priority matrix and the gradient matrix; determining a splitting path based on the integration matrix; and splitting the original image into multiple sub-images based on the splitting path.

20 Claims, 10 Drawing Sheets

(56) References Cited

U.S. PATENT DOCUMENTS

| | | | |
|---|---|---|---|
| 2015/0091778 A1* | 4/2015 | Day | G16Z 99/00 |
| | | | 345/1.3 |
| 2015/0262420 A1* | 9/2015 | Arun | G06F 3/1446 |
| | | | 345/420 |
| 2016/0155410 A1* | 6/2016 | Nam | G06F 3/1438 |
| | | | 715/745 |
| 2016/0358582 A1* | 12/2016 | Lee | G06F 3/1446 |
| 2017/0013206 A1* | 1/2017 | Fujimori | H04N 23/80 |
| 2017/0262247 A1* | 9/2017 | Yoganandan | G06F 3/1462 |

* cited by examiner

FIG. 8

IMAGE DISPLAY METHOD AND CONTROL SYSTEM

CROSS-REFERENCE TO RELATED APPLICATION

This application claims the priority benefit of Taiwan application serial no. 113103963, filed on Feb. 1, 2024. The entirety of the above-mentioned patent application is hereby incorporated by reference herein and made a part of this specification.

BACKGROUND

Technical Field

The disclosure relates to an image processing mechanism, and in particular to an image display method and a control system.

Description of Related Art

Digital video walls configure multiple images to multiple displays through matrix devices and image processors, thereby presenting a huge spliced video wall. The current technology for splitting one image into multiple images and distributing them to multiple displays for presentation is based on the arrangement of the displays to perform corresponding splitting. However, this may easily cause important information on the image to be disconnected and lead to reading difficulties. For example, if a word or a text is split in the middle, the text may be blocked on display, thus affecting the interpretation for the information.

SUMMARY

The disclosure provides an image display method and a control system, which can improve the priority of the region of interest and avoid splitting in important positions.

The image display method of the disclosure includes: splitting an original image into multiple sub-images via a processor; and outputting the sub-images to multiple corresponding displays via the processor, and respectively displaying the sub-images by the corresponding displays. Splitting the original image into the sub-images includes: finding multiple regions of interest by analyzing the original image, and generating a region of interest matrix with a same size as the original image based on the regions of interest, in which multiple pixels corresponding to the regions of interest are filled with a first value, and the plurality of pixels not corresponding to the plurality of regions of interest are filled with a second value; performing a specified operation on each of the pixels of the original image by a mask to obtain a priority matrix with the same size as the original image; performing a gradient calculation on each of the pixels of the original image to generate a gradient matrix with the same size as the original image; generating an integration matrix based on the region of interest matrix, the priority matrix, and the gradient matrix; determining a splitting path based on the integration matrix; and splitting the original image into the sub-images based on the splitting path.

The image display control system of the disclosure includes: a storage, storing the original image; the displays; and a processor, coupled to the storage and the displays, and the processor is configured to perform the image display method.

A non-transitory computer-readable storage medium of the disclosure stores one or more program code fragments, and the one or more program code fragments are loaded by the processor to perform the image display method.

Based on the above, the disclosure adopts a series of algorithms to analyze the priority of information in the original image, and determine the splitting path while retaining relatively important information. Accordingly, the priority can be increased for the region of interest to avoid splitting in important positions.

BRIEF DESCRIPTION OF THE DRAWINGS

FIG. 8 is a schematic diagram illustrating a point insertion operation according to an embodiment of the disclosure.

DESCRIPTION OF THE EMBODIMENTS

Figure 1:
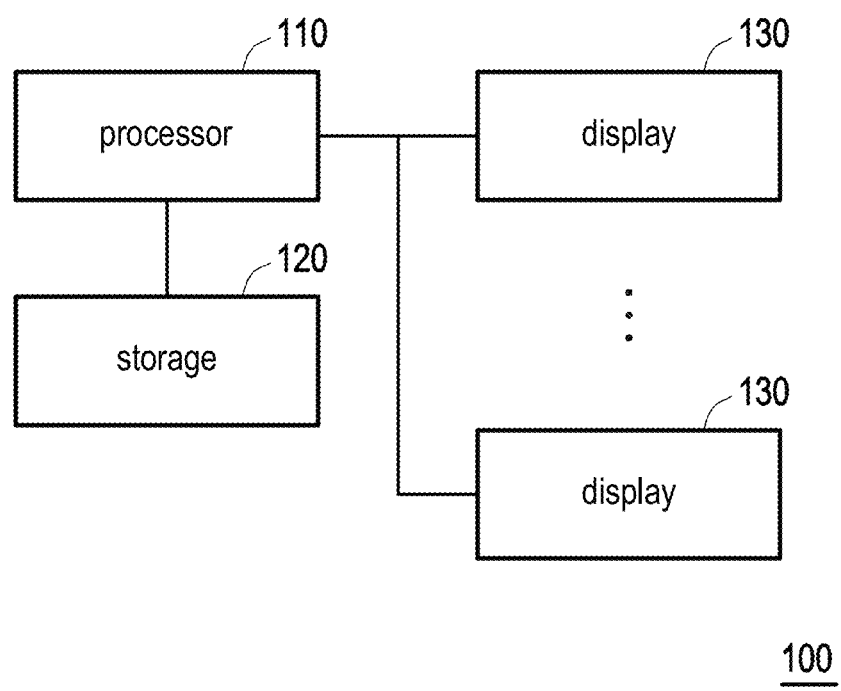
FIG. 1 is a block diagram of an image display control system according to an embodiment of the disclosure.

FIG. 1 is a block diagram of an image display control system according to an embodiment of the disclosure. Referring to FIG. 1, a control system 100 includes a processor 110, a storage 120, and multiple displays 130. The processor 110 is coupled to the storage 120 and the displays 130.

The processor 110 is, for example, a central processing unit (CPU), a physical processing unit (PPU), a programmable microprocessor, an embedded control chip, a digital signal processor (DSP), an application specific integrated circuit (ASIC), or other similar devices.

The storage 120 is, for example, any type of fixed or removable random access memory (RAM), read-only memory (ROM), flash memory, hardware disc, or other similar devices, or a combination of these devices. The storage 120 is used to store an original image, and also stores one or more program code fragments. After being installed, the one or more program code fragments are executed by the processor 110 to implement an image display method described below.

The display 130 is, for example, a liquid crystal display (LCD), a plasma display, and so on. In this embodiment, the displays 130 are used to form a giant video wall. The video wall may be any irregular large-scale display screen spliced together. The processor 110 splits the original image into multiple sub-images, and distributes the split sub-images to the displays 130 so as to combine display screens of the displays 130 into one screen, thereby achieving the effect of large-scale image output. The processor 110 may be divided into three types according to different supported functions: a signal distributor, a splicing processor, and a matrix switcher. In an embodiment, the processor 110 obtains in advance a pixel information of the displays 130 and a relative position information of the displays 130.

In an embodiment, the processor 110 and the storage 120 are disposed in a same host (such as a server). The server may communicate with the displays 130 through wired or wireless means. For example, the server includes multiple connection ports, and is connected to the displays 130 in a wired manner through the connection ports. Alternatively, the host includes a hardware communication chip (network card, Wi-Fi module, Bluetooth module, etc.) that supports wireless communication protocols, thereby communicating with the displays 130 in a wireless manner. The processor 110 is used to distribute multiple image signals to each of the displays 130 for display. Each of the displays 130 includes a display control chip (such as a Scaler IC (integrated circuit)) or a display processor (a small-sized processor).

The server knows in advance the pixel information of the displays 130 (including a frame information of each of the displays 130) and the relative position information of the displays 130. The processor 110 obtains and processes an image information, transmits the image information to a corresponding window of the display 130 (such as a wired network interface/a wireless network chip) through wireless/wired network means, and outputs the image information to the coupled display control chip/display processor through the corresponding window to display corresponding content through the display control chip/display processor based on the image information.

Figure 2:
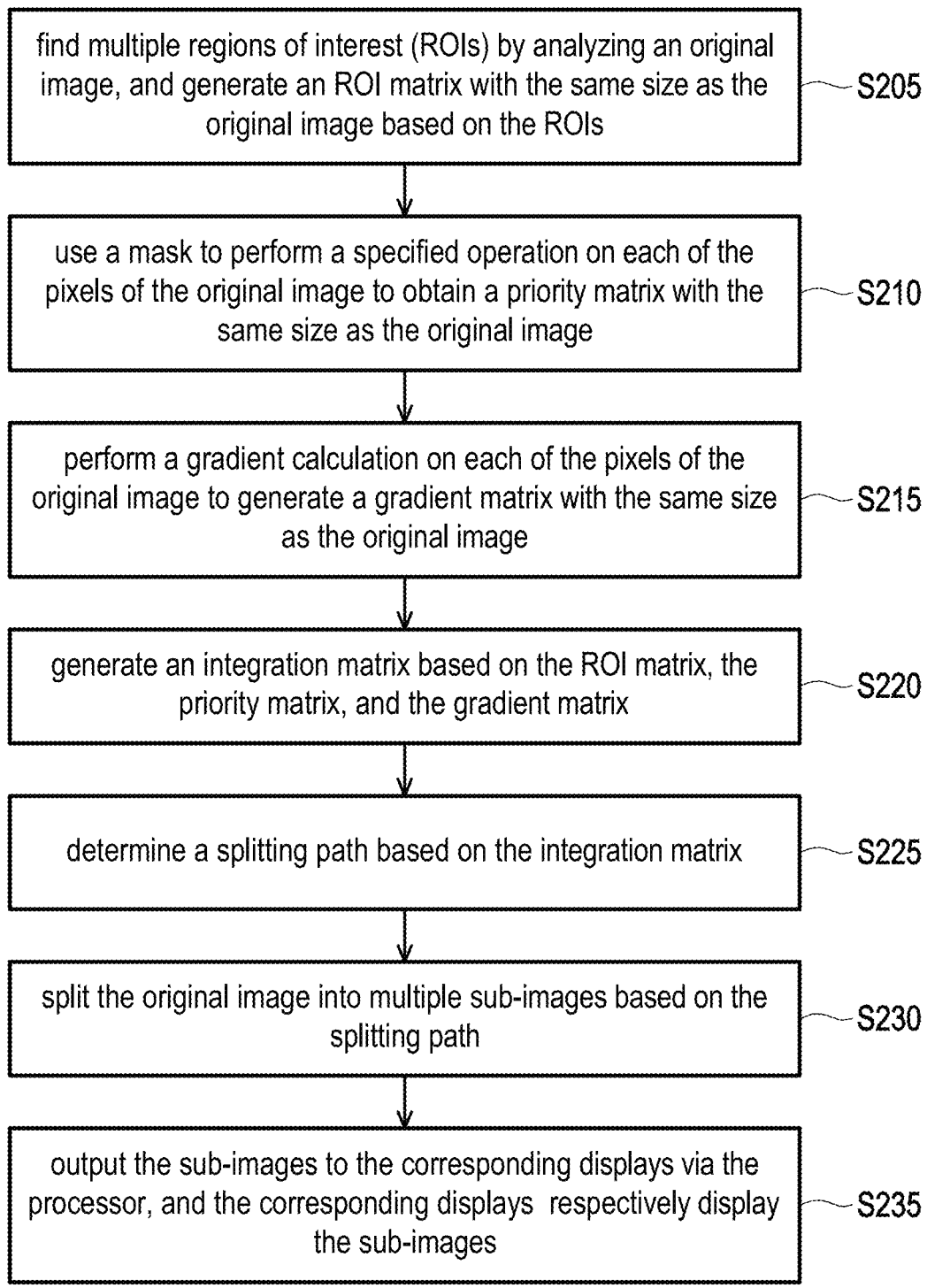
FIG. 2 is a flowchart of an image display method according to an embodiment of the disclosure.

FIG. 2 is a flowchart of an image display method according to an embodiment of the disclosure. Referring to FIGS. 1 and 2, in this embodiment, before displaying the image, the original image is split into the sub-images (including steps S205-S230).

In step S205, multiple regions of interest (ROIs) are found by analyzing the original image, and an ROI matrix with a same size as the original image is generated based on the ROIs. A pixel corresponding to the ROI in the ROI matrix is filled with a first value (for example, 255), and a pixel not corresponding to the ROIs are filled with a second value (for example, 0).

Figures 3, 4:
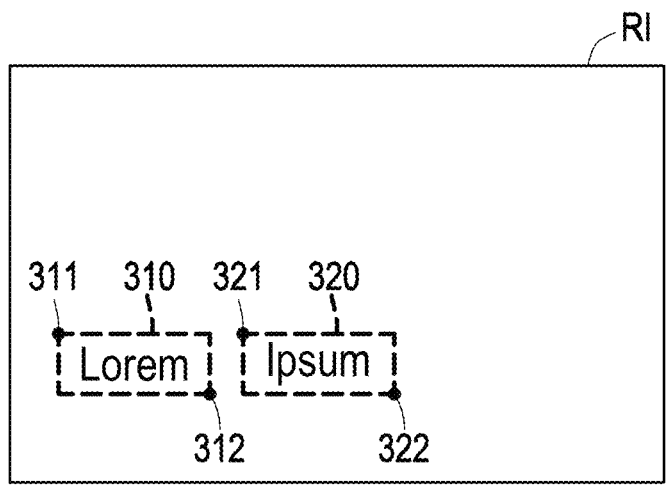
FIG. 3 is a schematic diagram of an original image according to an embodiment of the disclosure.
FIG. 4 is a schematic diagram of an ROI matrix according to an embodiment of the disclosure.

FIG. 3 is a schematic diagram of an original image according to an embodiment of the disclosure. Referring to FIG. 3, in this embodiment, after the processor 110 converts the original image from a color format to a grayscale format, an optical character recognition (OCR) is used to identify texts "Lorem" and "Ipsum" in an original image RI to obtain ROIs 310 and 320. In this embodiment, OCR text detection is used as an example, but is not limited to text detection and may also be used in other ROIs to be retained.

In an embodiment, after the text is found through OCR, a rectangular frame may be used to frame the recognized text, and coordinates of two points at an upper left corner and a lower right corner of the rectangular frame are recorded. A region framed by the two points represents the corresponding ROI. As shown in FIG. 3, points 311 and 312 represent the range of the ROI 310, and points 321 and 322 represent the range of the ROI 320.

FIG. 4 is a schematic diagram of an ROI matrix according to an embodiment of the disclosure. Referring to FIG. 4, assuming that a ROI matrix $M_1$ is obtained from the original image RI shown in FIG. 3. For ease of explanation, FIG. 4 only shows a region 410 corresponding to the ROI 310, and omits most of the pixels. Referring to FIG. 4, the value of each of the pixels in the region 410 is 255, and the value of the pixels outside the region 410 that are not corresponding to the ROIs 310 and 410 is 0.

Returning to FIG. 2, in step S210, a mask is used to perform a specified operation on each of the pixels of the original image RI to obtain a priority matrix with the same size as the original image RI. One of the pixels in the original image RI is selected one by one as a point to be processed. The point to be processed is used as a center point of the mask, and the mask is used to select the point to be processed and multiple adjacent points. Afterwards, multiple squares of the difference respectively between the point to be processed and the adjacent points are calculated, and an average value of the squares of the difference is calculated, so that the average value is filled in the position corresponding to the point to be processed in the priority matrix.

Figure 5:
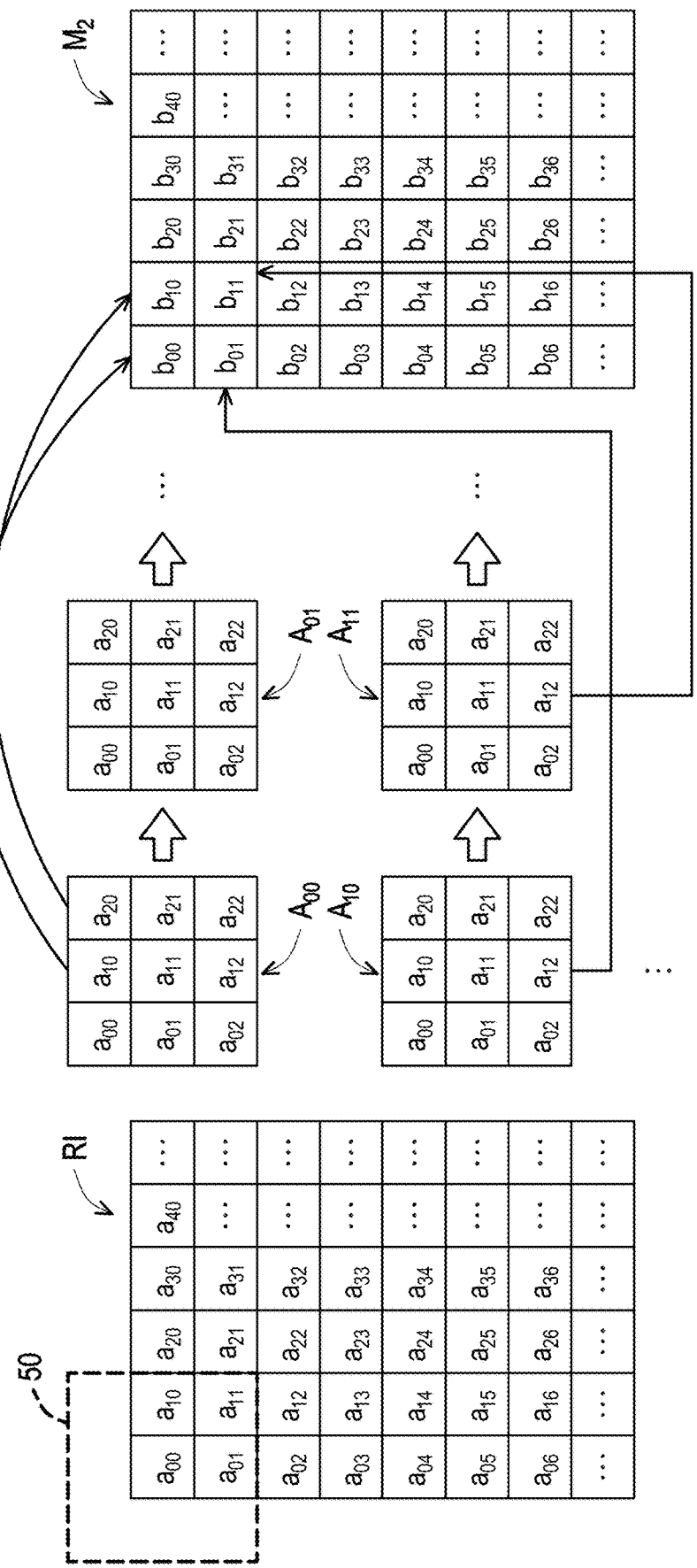
FIG. 5 is a schematic diagram of using a mask to perform a specified operations according to an embodiment of the disclosure.

FIG. 5 is a schematic diagram of using a mask to perform a specified operations according to an embodiment of the disclosure. In this embodiment, a mask 50 of 3×3 is used as an example for explanation. Starting from an origin (0,0) of the original image RI as the point to be processed, the mask 50 is used to extract adjacent points (0,1), (1,0), and (1,1) to obtain a matrix $A_{00}$. The square of the difference between each of the adjacent points and the point to be processed is calculated and the average value is used as a value boo of the origin (0,0) in the priority matrix, that is:

$$b_{00} = \frac{(a_{01} - a_{00})^2 + (a_{10} - a_{00})^2 + (a_{11} - a_{00})^2}{3}$$

Next, starting from point (1,0) of the original image RI as the point to be processed, the mask 50 is used to extract the adjacent points (0,0), (2,0), (0,1), (1,1), and (2,1) to obtain a matrix $A_{01}$, the square of the difference between each of the adjacent points and the point to be processed is calculated, and the average value is used as a value $b^{10}$ of point (1,0) in the priority matrix, that is:

$$b_{10} = \frac{(a_{00} - a_{10})^2 + (a_{20} - a_{10})^2 + \ldots + (a_{21} - a_{10})^2}{5}$$

By analogy, the points in a first horizontal row have been calculated. Next, the points in a second horizontal row are calculated. Starting from point (0,1) of the original image RI as the point to be processed, the mask 50 is used to extract the adjacent points (0,0), (1,0), (1,1), (0,2), and (1,2) to obtain a matrix $A_{10}$. The square of the difference between each of the adjacent points and the point to be processed is calculated, and the average value is used as a value $b_{01}$ of point (0,1) in the priority matrix, that is:

$$b_{01} = \frac{(a_{00} - a_{01})^2 + (a_{10} - a_{01})^2 + \ldots + (a_{12} - a_{01})^2}{5}$$

Next, starting from point (1,1) of the original image RI as the point to be processed, the mask 50 is used to extract the adjacent points (0,0), (1,0), (2,0), (0,1), (2,1), (0,2), (1,2), and (2,2) to obtain a matrix $A_{11}$. The square of the difference between each of the adjacent points and the point to be processed is calculated, and the average value is used as a value $b_{11}$ of point (1,1) in the priority matrix, that is:

$$b_{11} = \frac{(a_{00} - a_{11})^2 + (a_{10} - a_{11})^2 + \ldots + (a_{12} - a_{11})^2 + (a_{22} - a_{11})^2}{8}$$

By analogy, a priority matrix $M_2$ is obtained.

Returning to FIG. 2, in step S215, a gradient calculation is performed on each of the pixels of the original image RI to generate a gradient matrix with the same size as the original image RI. In image processing, gradients are used to represent intensity changes in images. Generally speaking, sharp changes in intensity imply the edges or contours of an object. Usually, partial differentiation is performed in the X direction and Y direction at the position of each of the pixels of the image to obtain a change intensity of the pixel.

In step S220, an integration matrix is generated based on the ROI matrix, the priority matrix, and the gradient matrix. For example:

$$M_T = G + M_2 + M_1$$

$M_T$ represents the integration matrix. G is the gradient matrix. $M_2$ is the priority matrix. $M_1$ is the ROI matrix.

Thereafter, in step S225, a splitting path is determined based on the integration matrix. The splitting path includes at least one splitting position. For example, assuming that the original image RI is to be split into two sub-images of left and right in a vertical direction (a first direction), the integration matrix is used to find the splitting position in the vertical direction. Assuming that the original image RI is to be split into two sub-images of upper and lower in a horizontal direction (a second direction), the integration matrix is used to find the splitting position in the horizontal direction. In addition, assuming that the original image RI is to be divided into multiple splits of 2×2, 3×3, 4×4, or unequally divided, the integration matrix may also be used to find the splitting positions in the vertical direction and/or the splitting positions in the horizontal direction.

Figure 6:
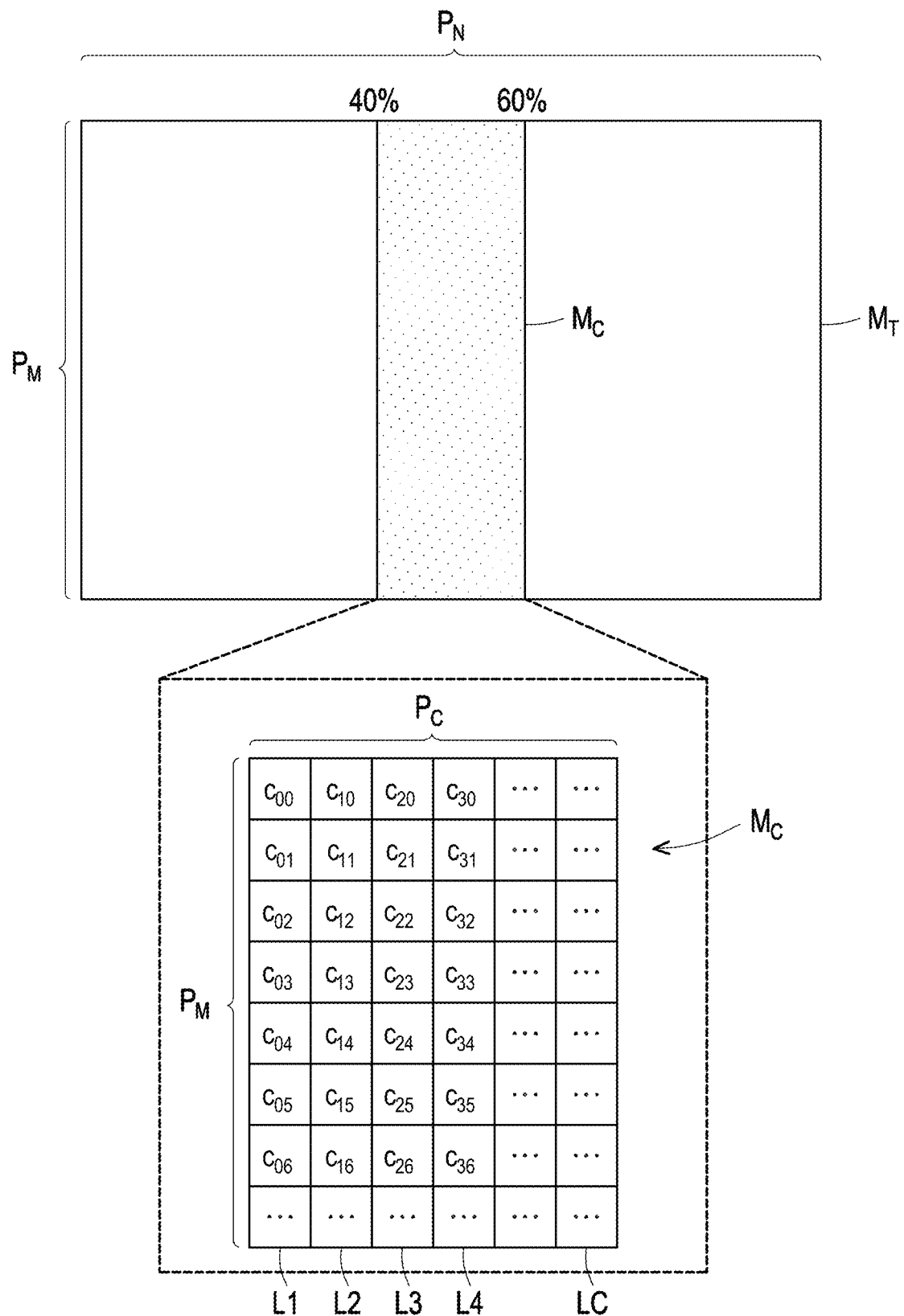
FIG. 6 is a schematic diagram of determining a splitting position according to an embodiment of the disclosure.

The following is an example of splitting the original image RI into two sub-images. FIG. 6 is a schematic diagram of determining a splitting position according to an embodiment of the disclosure. Referring to FIG. 6, in this embodiment, a specified region in the integration matrix $M_T$ is determined based on the first direction. Here, the first direction is the Y direction (the vertical direction) in image coordinates, and the second direction is the X direction (the horizontal direction) in the image coordinates. Assuming that the integration matrix $M_T$ has $P_M$ rows and $P_N$ columns, denoted as $P_M \times P_N$. That is, there are $P_M$ elements in the Y direction and $P_N$ elements in the X direction. Here, the original image RI is split in the vertical direction, which is an example of being split into two sub-images of left and right. The integration matrix $M_T$ is divided in the X direction to extract the specified region in the middle of the integration matrix $M_T$. For example, splitting in the X direction to extract a region of 40% to 60% as a specified region $M_C$ with a size of $P_M \times P_C$ ($P_C = 0.2 \times P_N$). That is, a region of $P_N \times 40\%$ to $P_N \times 60\%$ is extracted.

Next, the specified region $M_C$ is divided into $P_C$ one-dimensional arrays L1 to LC in the X direction. Each of the one-dimensional arrays L1 to LC includes $P_M$ elements in the Y direction. The values of the $P_M$ elements included in each of the one-dimensional arrays L1 to LC are accumulated to obtain $P_C$ sum values corresponding to the $P_C$ one-dimensional arrays L1 to LC respectively. For example, the sum value of the one-dimensional array L1 is $a_1 = c_{00} + c_{01} + c_{02} + c_{03} + c_{04} + \ldots$, the sum value of the one-dimensional array L2 is $a_2 = c_{10} + c_{11} + c_{12} + c_{13} + c_{14} + \ldots$, and so on. The sum values $a_1$ to $a_C$ corresponding to the one-dimensional arrays L1 to LC are obtained. Afterwards, a minimum value among the $P_C$ sum values ($a_1$ to $a_C$) is found, and the corresponding one-dimensional array thereof is used as the splitting position. By analogy, the splitting positions may be found according to actual needs.

In step S230, the original image RI is split into the sub-images based on the splitting path. Assuming that the minimum value is $a_3$, the one-dimensional array L3 is used as the splitting position. Assuming that the one-dimensional array L3 corresponds to the $P_S$-th column of the original image RI in the vertical direction, in an embodiment, the original image may be divided into one of the sub-images from the region from the X coordinate being 0 to the X coordinate being $P_S - 1$, and the region from the X coordinate being $P_S$ to the X coordinate being $P_N$ is divided into another sub-image.

By analogy, for example, the original image RI is split into 4 (2×2) sub-images, the original image RI may be split into an left sub-image and a right sub-image according to the above steps, and then the two sub-images are respectively split into an upper sub-image and a lower sub-image. In addition, the original image RI may also be split into an upper sub-images and a lower sub-image according to the above steps, and then the two sub-images are respectively split into a left sub-image and a right sub-image according to the above steps.

In step S235, the sub-images are output to the corresponding displays 130 via the processor 110, and the corresponding displays 130 respectively display the sub-images.

Before the processor 110 outputs the sub-images to the displays 130, the processor 110 may further determine whether to perform a point deletion or insertion operation on each of the sub-images based on the size of the split sub-images. Specifically, the integration matrix $M_T$ is split into multiple sub-matrices corresponding to the sub-images based on the splitting position. Performing the point deletion or insertion operation on each of the sub-images is determined based on whether the number of pixels included in each of the sub-images in the second direction perpendicular to the first direction is greater than a default value.

In response to the split sub-images having a first sub-image with a number of pixels in the second direction greater than the default value, the point deletion operation is performed on the first sub-image. In response to the split sub-images having a second sub-image with a number of pixels in the second direction less than a preset value, the point insertion operation is performed on the second sub-image. In response to the number of pixels included in each of the split sub-images in the second direction being equal to the default value, neither point deletion operation nor point insertion operation is performed on the sub-images.

In an embodiment, the size of the original image RI is 1185 pixels in the horizontal direction (X direction) and 1179 pixels in the vertical direction (Y direction). The original image RI is split into the first sub-image and the second sub-image. The size of the first sub-image is 973 pixels in the horizontal direction and 1179 pixels in the vertical direction. The size of the second sub-image is 902 pixels in the horizontal direction and 1179 pixels in the vertical direction. Taking the default value of 910 as an example, the number of pixels in the X direction of the first sub-image is greater than 910 so the point deletion operation is determined to be performed on the first sub-image; the number of pixels in the X direction of the second sub-image is less than 910 so the point insertion operation is determined to be performed on the second sub-image.

Figure 7:
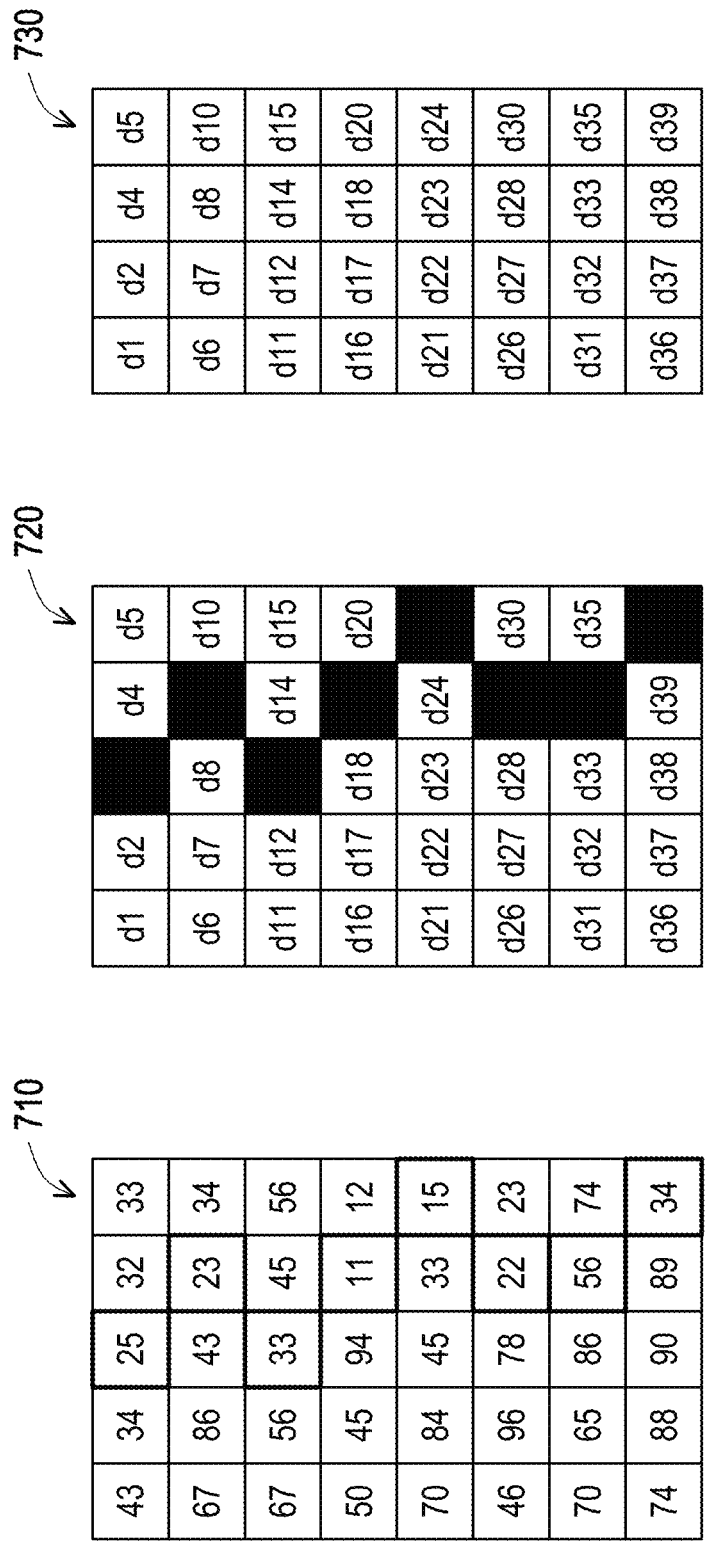
FIG. 7 is a schematic diagram illustrating a point deletion operation according to an embodiment of the disclosure.
Figure 9A:
FIGS. 9A to 9G are schematic diagrams of practical applications according to an embodiment of the disclosure.
Figure 9B:
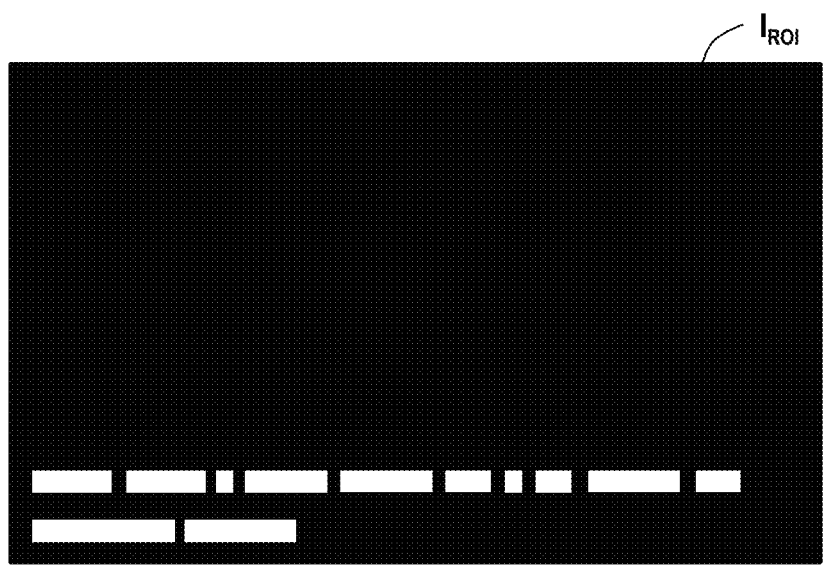
Figure 9C:
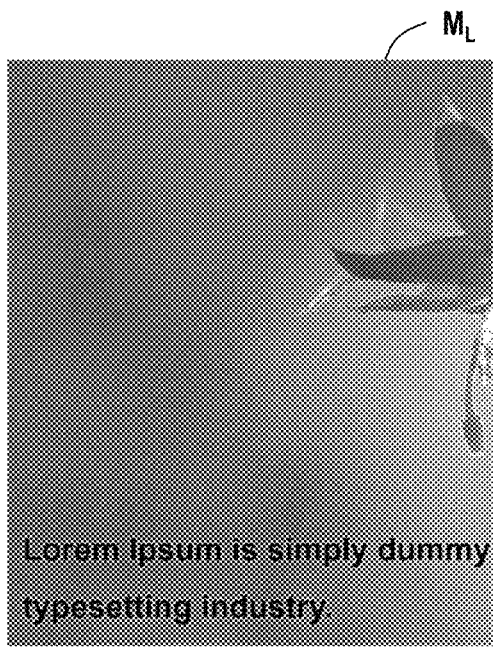
Figure 9D:
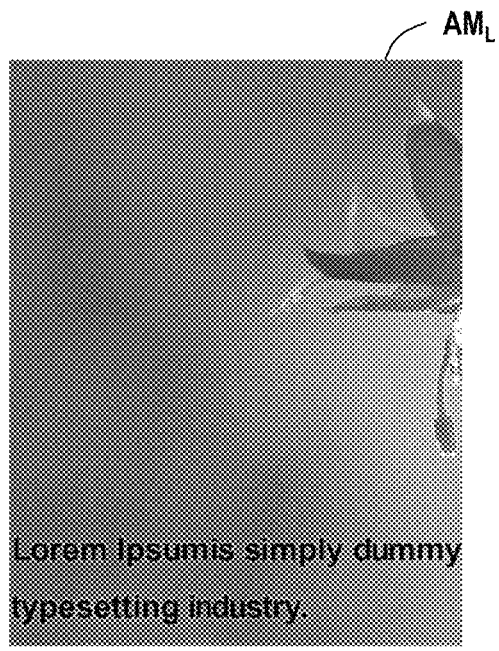
Figure 9E:
Figure 9F:
Figure 9G:
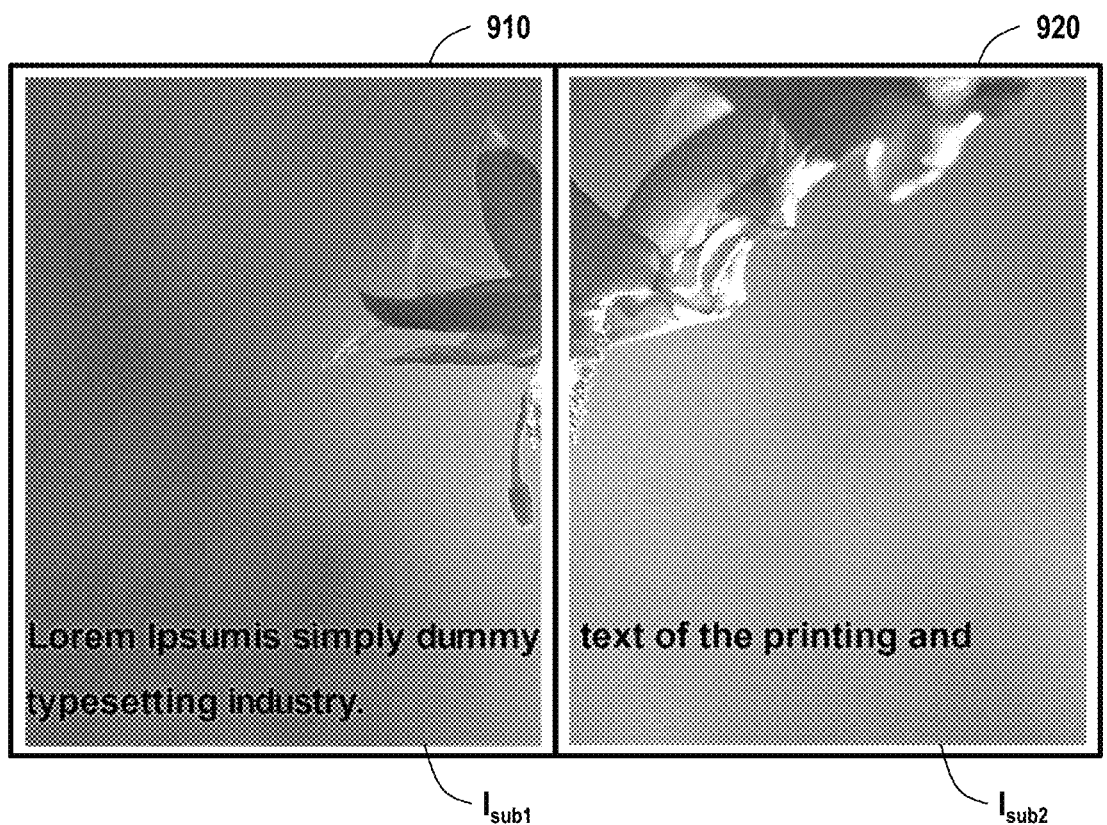

FIG. 7 is a schematic diagram illustrating a point deletion operation according to an embodiment of the disclosure. Referring to FIG. 7, in this embodiment, assuming that the original image RI is split into a left sub-image and a right sub-image (the first sub-image and the second sub-image) in the vertical direction (the first direction), and the point deletion operation is determined to be performed on the first sub-image. Assuming that the first sub-image corresponds to a sub-matrix 710. The sub-matrix 710 is a matrix obtained by splitting the integration matrix.

First, in step (a1), the sub-matrix 710 is divided into multiple one-dimensional arrays in the vertical direction, and each of the one-dimensional arrays includes multiple elements in the horizontal direction. In the example shown in FIG. 7, the sub-matrix 710 is divided into 8 one-dimensional arrays, and each of the one-dimensional arrays includes 5 elements. Next, in step (a2), an element with minimum value among all elements included in each of the one-dimensional arrays is found, and the position of the element with minimum value is recorded into a position data set.

An array of horizontal first row includes 5 elements (the position coordinates thereof are marked as (0,1), (0,2), (0,3), (0,4), and (0,5) respectively) with values of 43, 34, 25, 32, and 33, respectively. The minimum value 25 is extracted from the 5 values, and the position thereof (0,2) is recorded to the position data set. An array of horizontal second row includes 5 elements (the position coordinates thereof are marked as (1,1), (1,2), (1,3), (1,4), and (1,5), respectively) with values of 67, 86, 43, 23, and 34, respectively. The minimum value 23 is extracted from the five values, and position thereof (1,3) is recorded to the position data set. By analogy, the positions (2,2), (3,3), (4,4), (5,3), (6,3), and (7,4) are sequentially recorded to the position data set.

Then, in step (a3), the pixels corresponding to each of the positions recorded in the position data set are deleted from a first sub-image 720 to obtain an image after point deletion 730.

In response to the number of pixels of the image after point deletion 730 in the second direction (X direction) being still greater than the default value, the above steps (a1) to (a3) are repeated until the number of pixels of the sub-image after point deletion in the second direction is equal to the default value.

Figure 8:
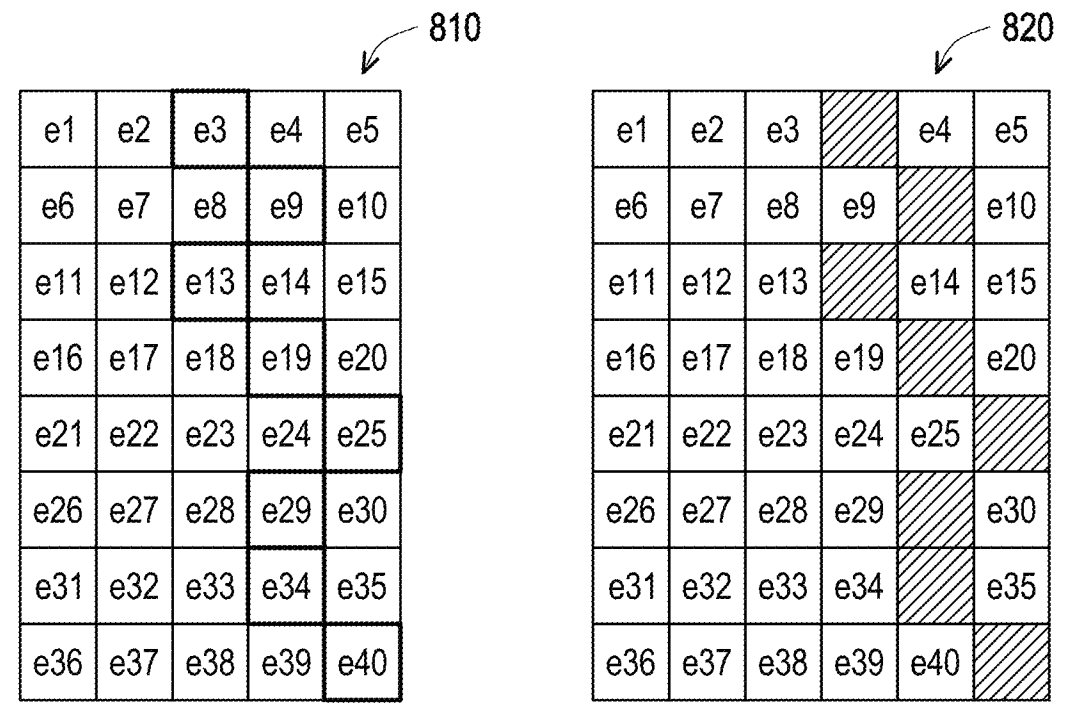

FIG. 8 is a schematic diagram illustrating a point insertion operation according to an embodiment of the disclosure. Referring to FIG. 8, in this embodiment, assuming that the original image RI is split into a left sub-image and a right sub-image (the first sub-image and the second sub-image) in the vertical direction (the first direction), the point insertion operation is determined to be performed on a second sub-image 810.

First, in step (b1), a second sub-matrix corresponding to the second sub-image 810 is divided into the one-dimensional arrays in the first direction, and each of the one-dimensional arrays includes the elements in the second direction. Next, in step (b2), the element with minimum value is found among the elements included in each of the one-dimensional arrays, and the position of the element with minimum value is recorded to the position data set. Here, the steps (b1) and (b2) are the same as the steps (a1) and (a2). It is assumed that the position data set has recorded the positions (0,2), (1,3), (2,2), (3,3), (4,4), (5,3), (6,3), and (7,4).

In step (b3), a new pixel is inserted in the second sub-image 810 in the specified direction corresponding to each of the positions recorded in the position data set, and a new interpolated value is obtained based on a pixel value of each of the positions and the pixel values of the pixels adjacent to each of the positions. The new interpolated value is filled into the new pixel. For example, the new pixel is inserted to the right of the pixel corresponding to each of the positions recorded in the position data set, as shown in an image after point insertion 820.

For position (0,2), a pixel value e3 of the position (0,2) and pixel values e2, e4, e7, e8, and e9 of the adjacent pixels are extracted. The average value of the pixel values e3, e2, e4, e7, e8, and e9 is used as the new interpolated value of the new pixel. The new interpolated value is filled into the position (0,3) of the image after point insertion 820.

For position (1,3), the pixel value e9 of the position (1,3) and the pixel values e3, e4, e5, e8, e10, e13, e14, and e15 of the adjacent pixels are extracted. The average value of the pixel values is used as the new interpolated value of the new pixel. The new interpolated value is filled into the position (1, 4) of the image after point insertion 820. By analogy, the new pixels are inserted to obtain the image after point insertion 820.

In step (b4), in response to the number of pixels of the image after point insertion 820 in the second direction being still less than the default value, the above steps (b1) to (b3) are repeated until the number of pixels of the image after point insertion 820 in the second direction is equal to the default value.

Finally, the first sub-image and the second sub-image obtained after the point deletion operation and/or the point insertion operation are respectively transmitted to the specified display 130 for display.

FIGS. 9A to 9G are schematic diagrams of practical applications according to an embodiment of the disclosure. Referring to FIGS. 9A to 9G, the processor 110 performs the OCR on an original image I (shown in FIG. 9A) to perform text detection to find multiple words and obtain the ROIs. Next, the processor 110 creates a zero-value matrix with the same size as the original image I, fills 255 in the position corresponding to the ROI in the zero-value matrix, and fills 0 in other positions that are not corresponding to the ROI to generate a ROI matrix $I_{ROI}$ (shown in FIG. 9B).

Afterwards, the processor 110 creates another zero-value matrix with the same size as the original image I. Based on the example shown in FIG. 5, the processor 110 uses the mask to perform the specified operation on each of the pixels in the original image I, and fills the obtained values into the corresponding positions in the zero-value matrix to obtain the priority matrix. Furthermore, the processor 110 performs the gradient calculation on the original image I to obtain the gradient matrix.

Thereafter, as shown in the steps S220 to S230, the splitting path is obtained to split the original image I left and right, thereby obtaining a first sub-image $M_L$ on the left and a second sub-image $M_R$ through horizontally flipping the sub-image on the right. Then, the point deletion operation is performed on the first sub-image $M_L$ (refer to the description of FIG. 7) to obtain an image after point deletion AML. Furthermore, the point insertion operation (refer to the description of FIG. 8) is performed on the second sub-image $M_R$ to obtain an image after point insertion AMR. Finally, the image after point deletion AML is used as a finally presented sub-image $I_{sub1}$, and the image after point insertion AMR is horizontally flipped as a finally presented sub-image $I_{sub2}$, which are respectively displayed on displays 910 and 920.

To sum up, the disclosure adopts a series of algorithms (finding the ROI, calculating priority, calculating image gradient, etc.), thereby analyzing the priority of information in the original image, and determining the splitting path while retaining relatively important information. Accordingly, the priority can be increased for the ROI to avoid splitting in important positions.

In addition, since the splitting path may not evenly split the original image, for the sub-image that is split as relatively large, the point deletion processing is performed on parts of a non-interest region, and for the sub-image split as relatively small, the point insertion processing is performed on parts of the non-interest region. Since the point deletion or point insertion processing is performed on parts of the non-interest region, when the ROI is text, the point deletion or point insertion processing may not have a large impact on the final reading experience. Accordingly, the relatively important information can be retained and information omission due to the frame (or spacing) of the display can be avoided.

What is claimed is:

1. An image display method, comprising:
   splitting an original image into a plurality of sub-images via a processor; and
   outputting the plurality of sub-images to a corresponding plurality of displays via the processor, and respectively displaying the plurality of sub-images by the corresponding plurality of displays,
   wherein splitting the original image into the plurality of sub-images comprises:
      finding a plurality of regions of interest by analyzing the original image, and generating a region of interest matrix with a same size as the original image based on the plurality of regions of interest, wherein in the region of interest matrix, a plurality of pixels corresponding to the plurality of regions of interest are filled with a first value, and the plurality of pixels not corresponding to the plurality of regions of interest are filled with a second value;
      performing a specified operation on each of the pixels of the original image by a mask to obtain a priority matrix with the same size as the original image;
      performing a gradient calculation on each of the pixels of the original image to generate a gradient matrix with the same size as the original image;
      generating an integration matrix based on the region of interest matrix, the priority matrix, and the gradient matrix;
      determining a splitting path based on the integration matrix; and
      splitting the original image into the plurality of sub-images based on the splitting path.

2. The image display method according to claim 1, wherein the splitting path comprises a splitting position, and determining the splitting path based on the integration matrix comprises:
   determining a specified region in the integration matrix based on a first direction, wherein the specified region is divided into a plurality of one-dimensional arrays in a second direction perpendicular to the first direction, and each of the plurality of one-dimensional arrays comprises a plurality of elements in the first direction;
   accumulating the values of the plurality of elements comprised in each of the plurality of one-dimensional arrays to obtain a plurality of sum values respectively corresponding to the plurality of one-dimensional arrays; and
   configuring the one-dimensional array corresponding to a minimum value among the plurality of sum values as the splitting position.

3. The image display method according to claim 1, wherein the splitting path comprises a splitting position, and after determining the splitting path based on the integration matrix, further comprising:
   splitting the integration matrix into a plurality of sub-matrices corresponding to the plurality of sub-images based on the splitting position; and
   determining to perform a point deletion operation or a point insertion operation on each of the plurality of sub-images based on whether the number of pixels respectively comprised in each of the plurality of sub-images in a second direction perpendicular to the first direction is greater than a default value,
   wherein in response to the plurality of split sub-images having a first sub-image with a number of pixels in the second direction greater than the default value, the point deletion operation is performed on the first sub-image,
   in response to the plurality of split sub-images having a second sub-image with a number of pixels in the second direction less than the default value, the point insertion operation is performed on the second sub-image,
   in response to the number of pixels respectively comprised in each of the plurality of split sub-images in the second direction being equal to the default value, neither point deletion operation nor point insertion operation is performed on the plurality of sub-images.

4. The image display method according to claim 3, wherein performing the point deletion operation on the first sub-image comprises:
   (a1) dividing a first sub-matrix corresponding to the first sub-image into a plurality of one-dimensional arrays in the first direction, wherein each of the plurality of one-dimensional arrays comprises a plurality of elements in the second direction;
   (a2) finding an element with minimum value among the plurality of elements comprised in each of the plurality of one-dimensional arrays, and recording a position of the element with minimum value to a position data set;
   (a3) deleting the pixel corresponding to each of the positions recorded in the position data set in the first sub-image; and
   (a4) repeating the (a1) to (a3) until the number of pixels of the first sub-image after point deletion in the second direction is equal to the default value in response to the number of pixels of the first sub-image after point deletion in the second direction being still greater than the default value.

5. The image display method according to claim 3, wherein performing the point insertion operation on the second sub-image comprises:
   (b1) dividing a second sub-matrix corresponding to the second sub-image into a plurality of one-dimensional arrays in the first direction, wherein each of the plurality of one-dimensional arrays comprises a plurality of elements in the second direction;
   (b2) finding an element with minimum value among the plurality of elements comprised in each of the plurality of one-dimensional arrays, and recording a position of the element with minimum value to a position data set;
   (b3) inserting a new pixel in the second sub-image in a specified direction corresponding to each of the positions recorded in the position data set, and obtaining a new interpolated value based on a pixel value corresponding to each of the positions and a pixel value of a plurality of pixels adjacent to each of the positions; and (b4) repeating the above (b1) to (b3) until the number of pixels of the second sub-image after point insertion in the second direction is equal to the default value in response to the number of pixels of the second sub-image after point insertion in the second direction being still less than the default value.

6. The image display method according to claim 1, wherein performing the specified operation on each of the pixels of the original image by the mask comprises:
selecting one of the plurality of pixels of the original image one by one as a point to be processed, configuring the point to be processed as a center point of the mask, and selecting the point to be processed and plurality of adjacent points by the mask; and
calculating a plurality of squares of the difference respectively between the point to be processed and the plurality of adjacent points, and calculating an average value of the plurality of squares of the difference to fill in the average value in a position corresponding to the point to be processed in the priority matrix.

7. The image display method according to claim 1, wherein finding the plurality of regions of interest by analyzing the original image comprises:
identifying a text in the original image by an optical character recognition to obtain the plurality of regions of interest.

8. The image display method according to claim 1, wherein finding the plurality of regions of interest by analyzing the original image, and generating the region of interest matrix with the same size as the original image based on the plurality of regions of interest comprise:
creating a zero-value matrix with the same size as the original image; and
generating the region of interest matrix by filling the first value into the plurality of pixels corresponding to the plurality of regions of interest in the zero-value matrix, and filling the second value into the plurality of pixels not corresponding to the plurality of regions of interest.

9. The image display method according to claim 1, further comprising:
obtaining in advance a pixel information of the plurality of displays and a relative position information of the plurality of displays through the processor.

10. An image display control system, comprising:
a storage, storing an original image;
a plurality of displays; and
a processor, coupled to the storage and the plurality of displays, wherein the processor is configured to:
finding a plurality of regions of interest by analyzing the original image, and generating a region of interest matrix with a same size as the original image based on the plurality of regions of interest, wherein in the region of interest matrix, a plurality of pixels corresponding to the plurality of regions of interest are filled with a first value, and the plurality of pixels not corresponding to the plurality of regions of interest are filled with a second value;
performing a specified operation on each of the pixels of the original image by a mask to obtain a priority matrix with the same size as the original image;
performing a gradient calculation on each of the pixels of the original image to generate a gradient matrix with the same size as the original image;
generating an integration matrix based on the region of interest matrix, the priority matrix, and the gradient matrix;
determining a splitting path based on the integration matrix;
splitting the original image into a plurality of sub-images based on the splitting path; and
outputting the plurality of sub-images to the corresponding plurality of displays, and the corresponding plurality of displays respectively display the plurality of sub-images.

11. The control system according to claim 10, wherein the splitting path comprises a splitting position, and the processor is configured to:
determining a specified region in the integration matrix based on a first direction, wherein the specified region is divided into a plurality of one-dimensional arrays in a second direction perpendicular to the first direction, and each of the plurality of one-dimensional arrays comprises a plurality of elements in the first direction;
accumulating the values of the plurality of elements comprised in each of the plurality of one-dimensional arrays to obtain a plurality of sum values respectively corresponding to the plurality of one-dimensional arrays; and
configuring the one-dimensional array corresponding to a minimum value among the plurality of sum values as the splitting position.

12. The control system according to claim 10, wherein the splitting path comprises a splitting position, and the processor is configured to:
splitting the integration matrix into a plurality of sub-matrices corresponding to the plurality of sub-images based on the splitting position; and
determining to perform a point deletion operation or a point insertion operation on each of the plurality of sub-images based on whether the number of pixels respectively comprised in each of the plurality of sub-images in a second direction perpendicular to the first direction is greater than a default value,
wherein the processor is configured to perform the point deletion operation on a first sub-image in response to the plurality of split sub-images having the first sub-image with a number of pixels in the second direction greater than the default value,
the processor is configured to perform the point insertion operation on a second sub-image in response to the plurality of split sub-images having the second sub-image with a number of pixels in the second direction less than the default value,
the processor is configured to not perform the point deletion operation nor the point insertion operation on the plurality of sub-images in response to the number of pixels respectively comprised in each of the plurality of split sub-images in the second direction being equal to the default value.

13. The control system according to claim 12, wherein the processor is configured to:
(a1) dividing a first sub-matrix corresponding to the first sub-image into a plurality of one-dimensional arrays in the first direction, wherein each of the plurality of one-dimensional arrays comprises a plurality of elements in the second direction;
(a2) finding an element with minimum value among the plurality of elements comprised in each of the plurality of one-dimensional arrays, and recording a position of the element with minimum value to a position data set;

(a3) deleting the pixel corresponding to each of the positions recorded in the position data set in the first sub-image; and (a4) repeating the (a1) to (a3) until the number of pixels of the first sub-image after point deletion in the second direction is equal to the default value in response to the number of pixels of the first sub-image after point deletion in the second direction being still greater than the default value.

14. The control system according to claim 12, wherein the processor is configured to:

(b1) dividing a second sub-matrix corresponding to the second sub-image into a plurality of one-dimensional arrays in the first direction, wherein each of the plurality of one-dimensional arrays comprises a plurality of elements in the second direction;

(b2) finding an element with minimum value among the plurality of elements comprised in each of the plurality of one-dimensional arrays, and recording a position of the element with minimum value to a position data set;

(b3) inserting a new pixel in the second sub-image in a specified direction corresponding to each of the positions recorded in the position data set, and obtaining a new interpolated value based on a pixel value corresponding to each of the positions and a pixel value of a plurality of pixels adjacent to each of the positions; and (b4) repeating the above (b1) to (b3) until the number of pixels of the second sub-image after point insertion in the second direction is equal to the default value in response to the number of pixels of the second sub-image after point insertion in the second direction being still less than the default value.

15. The control system according to claim 10, wherein the processor is configured to:

selecting one of the plurality of pixels of the original image one by one as a point to be processed, configuring the point to be processed as a center point of the mask, and selecting the point to be processed and plurality of adjacent points through the mask; and calculating a plurality of squares of the difference respectively between the point to be processed and the plurality of adjacent points, and calculating an average value of the plurality of squares of the difference to fill in the average value in a position corresponding to the point to be processed in the priority matrix.

16. The control system according to claim 10, wherein the processor is configured to:

identifying a text in the original image by an optical character recognition to obtain the plurality of regions of interest.

17. The control system according to claim 10, wherein the processor is configured to:

creating a zero-value matrix with the same size as the original image; and generating the region of interest matrix by filling the first value into the plurality of pixels corresponding to the plurality of regions of interest in the zero-value matrix, and filling the second value into the plurality of pixels not corresponding to the plurality of regions of interest.

18. The control system according to claim 10, wherein the processor is configured to:

obtaining in advance a pixel information of the plurality of displays and a relative position information of the plurality of displays.

19. The control system according to claim 10, wherein the processor and the storage are disposed in a same host, and the host communicates with the plurality of displays through wired or wireless means.

20. A non-transitory computer-readable storage medium, storing one or more program code fragments, wherein the one or more program code fragments are loaded by a processor to perform as follows, comprising:

finding a plurality of regions of interest by analyzing an original image, and generating a region of interest matrix with a same size as the original image based on the plurality of regions of interest, wherein in the region of interest matrix, a plurality of pixels corresponding to the plurality of regions of interest are filled with a first value, and the plurality of pixels not corresponding to the plurality of regions of interest are filled with a second value;

performing a specified operation on each of the pixels of the original image by a mask to obtain a priority matrix with the same size as the original image;

performing a gradient calculation on each of the pixels of the original image to generate a gradient matrix with the same size as the original image;

generating an integration matrix based on the region of interest matrix, the priority matrix, and the gradient matrix;

determining a splitting path based on the integration matrix;

splitting the original image into a plurality of sub-images based on the splitting path; and outputting the plurality of sub-images to a corresponding plurality of displays, and the corresponding plurality of displays respectively display the plurality of sub-images.

* * * * *